US011060161B2

(12) United States Patent
Bello et al.

(10) Patent No.: US 11,060,161 B2
(45) Date of Patent: Jul. 13, 2021

(54) PART WITH VERY HIGH MECHANICAL PROPERTIES FROM A ROLLED COATED SHEET

(71) Applicant: ArcelorMittal, Luxembourg (LU)

(72) Inventors: Alain Bello, Hettange-Grande (FR); Vivian Fabbri, Homecourt (FR); Gerard Dugelay, Metz (FR)

(73) Assignee: ArcelorMittal, Luxembourg (LU)

( * ) Notice: Subject to any disclaimer, the term of this patent is extended or adjusted under 35 U.S.C. 154(b) by 704 days.

(21) Appl. No.: 15/445,774

(22) Filed: Feb. 28, 2017

(65) Prior Publication Data

US 2017/0166991 A1   Jun. 15, 2017

Related U.S. Application Data

(62) Division of application No. 12/091,635, filed as application No. PCT/FR2006/002316 on Oct. 12, 2006, now Pat. No. 9,611,530.

(30) Foreign Application Priority Data

Oct. 27, 2005  (WO) ................. PCT/FR2005/002689

(51) Int. Cl.
*C21D 9/46* (2006.01)
*C22C 38/32* (2006.01)
(Continued)

(52) U.S. Cl.
CPC .............. *C21D 9/46* (2013.01); *B32B 15/013* (2013.01); *C21D 8/0236* (2013.01);
(Continued)

(58) Field of Classification Search
CPC ...... C21D 9/46; C21D 8/0278; C21D 8/0236; C21D 2211/008; C21D 2211/002;
(Continued)

(56) References Cited

U.S. PATENT DOCUMENTS 6,177,140 B1   1/2001 Patil et al.
2001/0042393 A1  11/2001 Kefferstein et al.
(Continued)

FOREIGN PATENT DOCUMENTS

CA  2520814 A1  10/2004
CA  2533633 A1   3/2005
(Continued)

OTHER PUBLICATIONS

Translation of Nishihata, Toshinobu, JP-2003147499-A, May 2003 (Year: 2003).*

(Continued)

*Primary Examiner* — John A Hevey
(74) *Attorney, Agent, or Firm* — Davidson, Davidson & Kappel, LLC

(57) ABSTRACT

The present invention provides a steel part. The steel part includes a steel precoated with a zinc-based alloy including, the contents being expressed by weight, from 0.5 to 2.5% aluminum and, optionally, one or more elements chosen from the group of: Pb≤0.003%; Sb≤0.003%; Bi≤0.003%; 0.002%.≤Si≤0.070%; La<0.05%; and Ce<0.05%. A balance of the precoat includes zinc and inevitable impurities. The steel part also includes a compound formed by at least one heat treatment for alloying between the steel and the precoat. The compound includes over more than 90% of its thickness, at least one Fe/Zn-based phase, the iron weight content of which is equal to 65% or higher and the Fe/Zn ratio of which is between 1.9 and 4. A structural or safety part is also provided.

14 Claims, 2 Drawing Sheets

(51) Int. Cl.

| | | |
|---|---|---|
| *C22C 18/00* | (2006.01) | |
| *C22C 38/18* | (2006.01) | |
| *C22C 38/28* | (2006.01) | |
| *C22C 38/04* | (2006.01) | |
| *C23C 8/00* | (2006.01) | |
| *C23C 2/28* | (2006.01) | |
| *C23C 2/26* | (2006.01) | |
| *B32B 15/01* | (2006.01) | |
| *C21D 8/02* | (2006.01) | |
| *C22C 18/04* | (2006.01) | |
| *C22C 38/00* | (2006.01) | |
| *C22C 38/02* | (2006.01) | |
| *C22C 38/06* | (2006.01) | |
| *C23C 2/06* | (2006.01) | |
| *C23C 2/40* | (2006.01) | |
| *C22C 38/26* | (2006.01) | |

(52) U.S. Cl.
CPC ............ *C21D 8/0278* (2013.01); *C22C 18/00* (2013.01); *C22C 18/04* (2013.01); *C22C 38/002* (2013.01); *C22C 38/02* (2013.01); *C22C 38/04* (2013.01); *C22C 38/06* (2013.01); *C22C 38/18* (2013.01); *C22C 38/26* (2013.01); *C22C 38/28* (2013.01); *C22C 38/32* (2013.01); *C23C 2/06* (2013.01); *C23C 2/26* (2013.01); *C23C 2/28* (2013.01); *C23C 2/40* (2013.01); *C23C 8/00* (2013.01); *C21D 2211/002* (2013.01); *C21D 2211/008* (2013.01)

(58) Field of Classification Search
CPC .... C23C 2/40; C23C 2/06; C23C 8/00; C23C 2/26; C23C 2/28; C22C 38/06; C22C 38/02; C22C 38/002; C22C 18/04; C22C 38/04; C22C 38/28; C22C 38/18; C22C 18/00; C22C 38/32; C22C 38/26; B32B 15/013
See application file for complete search history.

(56) References Cited

U.S. PATENT DOCUMENTS

| | | | |
|---|---|---|---|
| 2003/0221752 A1* | 12/2003 | Utsumi | C22C 38/02 |
| | | | 148/334 |
| 2004/0163439 A1 | 8/2004 | Arns et al. | |
| 2006/0121305 A1 | 6/2006 | Yoshikawa et al. | |
| 2007/0256808 A1* | 11/2007 | Fleischanderl | C25D 5/36 |
| | | | 164/72 |

FOREIGN PATENT DOCUMENTS

| | | | | |
|---|---|---|---|---|
| CN | 1138106 | A | 12/1996 | |
| EP | 0365682 | A1 | 5/1990 | |
| EP | 0613961 | A1 | 9/1994 | |
| EP | 1143029 | A1 | 10/2001 | |
| EP | 1577407 | A1 | 9/2005 | |
| JP | 2001140022 | A | 5/2001 | |
| JP | 2002060978 | A | 2/2002 | |
| JP | 2003073774 | A | 3/2003 | |
| JP | 2003147499 | A * | 5/2003 | |
| JP | 2004315965 | A | 11/2004 | |
| JP | 2005240072 | A | 9/2005 | |
| RU | 2114930 | C1 | 7/1998 | |
| RU | 2128719 | C1 | 4/1999 | |
| RU | 2241063 | C2 | 11/2004 | |
| WO | 8909844 | A1 | 10/1989 | |
| WO | 2004094684 | A1 | 11/2004 | |
| WO | WO-2005021821 | A1 * | 3/2005 | ............ C21D 1/673 |

OTHER PUBLICATIONS

Translation of Takahashi, Akira, JP-2005240072-A, Sep. 2005 (Year: 2005).*
Takahasi et al. Partial PTO English Translation of JP 2005-240072, Sep. 2005, pp. 1-3.
Marder, A.R., "The Metallurgy of Zinc-Coated Steel", Progress in Materials Science, 2000, Pergamon, 45, 191-271.

* cited by examiner

PART WITH VERY HIGH MECHANICAL PROPERTIES FROM A ROLLED COATED SHEET

CROSS REFERENCE TO RELATED APPLICATIONS

This is a divisional of U.S. application Ser. No. 12/091,635 filed on Sep. 26, 2008 which was a national stage of PCT/FR2006/002316 filed on Oct. 12, 2006 which claims priority to PCT/FR2005/002689 filed on Oct. 27, 2005.

The invention relates to the manufacture of hot-rolled or cold-rolled coated steel parts exhibiting high mechanical strength and good corrosion resistance.

BACKGROUND

For some applications, it is desired to produce steel parts that combine high mechanical strength, good impact strength and good corrosion resistance. This type of combination is particularly desirable in the automobile industry, in which the objective is to produce significantly lighter vehicles. This may in particular be achieved by using parts made of steels having very high mechanical properties, the microstructure of which is martensitic or bainitic-martensitic. Anti-intrusion, structural or safety parts of motor vehicles, such as fender cross-members, door or center pillar reinforcements and wheel arms, require for example the abovementioned qualities.

Patent FR20004427 discloses a manufacturing process in which a rolled steel sheet is provided with a metal precoat consisting of zinc or a zinc-based alloy, the steel possessing, for example, a tensile strength of around 500 MPa. The sheet is then cut to obtain a blank, which is subjected to a heat treatment for the purpose of forming an alloyed compound on the surface and of hot-stamping the blank. Next, this blank is cooled under conditions suitable for giving the steel a high hardness. By starting with a steel having an initial strength of 500 MPa, parts with a mechanical strength of greater than 1500 MPa are for example obtained. The alloyed compound formed by interdiffusion of the precoat and the steel during the heat treatment thus provides protection against corrosion and decarburation, and provides a high-temperature lubrication function, which allows the lifetime of hot-drawing tools to be increased.

In comparison with a hot-stamping process carried out on bare parts, that is to say those with no precoat, the presence of the compound provides protection against decarburation during in-furnace heating. It also dispenses with the need to shotpeen or sandblast the parts subsequently, in order to remove the irregular surface layer that forms by oxidation in the furnace.

However, limitations may be encountered when carrying out this process in certain applications that require particular properties of the coating formed by alloying:

the hot-stamped parts may include regions of pronounced concavity. Given the difference in hot hardness and rheology between the base steel and the coating, the phenomenon of coating indentation in the base steel may be encountered, in particular in highly deformed regions. In the case of parts that are mechanically highly stressed, it is desirable to avoid these indentations, which are potential defect initiation zones;

during the heat treatment resulting in the alloying between the steel and the precoat, iron-rich Fe/Zn phases are nucleated and zinc near these nucleation sites undergoes diffusion. This diffusion creates vacancies, possibly resulting in the creation of compactness defects at a microscopic level. The most favorable manufacturing conditions are therefore sought in order to reduce or eliminate these compactness defects in the coating;

it is also sought to minimize tool wear during forming operations, which may be relatively pronounced depending on the coating. It has been found that coatings with a high roughness are disadvantageous with regard to tool integrity. It is therefore endeavored to obtain conditions that reduce the roughness of this coating; and it is also sought to obtain a regular surface appearance of the coating after the alloying heat treatment, when the parts are intended to possibly undergo a subsequent painting operation or are to be used as visible parts.

BRIEF SUMMARY

In particular, an object of the present invention is to avoid the appearance of surface crazing after the heat treatment. Such a visual defect in the coating is characterized by the juxtaposition of cells, generally having a size of a few millimeters, separated by boundaries. Within any one cell, the thickness of the coating is approximately constant, whereas the thickness of the coating is irregular at cell boundaries.

An object of the present invention provides a process for manufacturing hot-rolled or cold-rolled steel parts precoated with a zinc-based alloy, which includes an alloying treatment step, the coating obtained after alloying having good compactness at the same time as high resistance to crazing and a roughness associated with satisfactory longevity of the forming tool. It is also desired to provide a process that does not result in indentation defects.

The present invention provides a steel part coated with a compound consisting, over more than 90% of its thickness, of at least one Fe/Zn-based phase, the Fe weight content of which is equal to 65% or higher and the Fe/Zn ratio of which is between 1.9 and 4, the compound being formed by at least one heat treatment for alloying between the steel and a precoat, the precoat being a zinc-based alloy comprising, the contents being expressed by weight, between 0.5 and 2.5% aluminum and, optionally, one or more elements chosen from: Pb≤0.003%; Sb≤0.003%; Bi≤0.003%; 0.002%≤Si≤0.070%; La<0.05%; Ce<0.05%, the balance consisting of zinc and inevitable impurities.

Preferably, the precoat is an alloy the aluminum content of which is not less than 0.5% but not more than 0.7% by weight.

According to a preferred embodiment, the precoat is an alloy the aluminum content of which is greater than 0.7% but not more than 0.8% by weight.

Also preferably, the precoat is an alloy the aluminum content of which is greater than 0.8% but not more than 2.5% by weight.

Preferably, the composition of the steel comprises, the contents being expressed by weight: 0.15%≤C≤0.5%; 0.5%≤Mn≤3%; 0.1%≤Si≤0.5%; 0.01%≤Cr≤1%; Ti≤0.2%; Al≤0.1%; S≤0.05%; P≤0.1%; 0.0005%≤B≤0.010%, the balance of the composition consisting of iron and inevitable impurities resulting from the smelting.

According to a preferred embodiment, the composition of the steel comprises, the contents being expressed by weight: 0.15%≤C≤0.25%; 0.8%≤Mn≤1.5%; 0.1%≤Si≤0.35%; 0.01%≤Cr≤0.3%; Ti≤0.1%; Al≤0.1%; S≤0.05%; P≤0.1%; 0.002%≤B≤0.005%, the balance of the composition consisting of iron and inevitable impurities resulting from the smelting.

The subject of the invention is also a process for manufacturing a coated steel part, comprising the steps according to which:

a hot-rolled or cold-rolled steel sheet is provided;

the sheet is coated with a metal precoat being formed by a zinc-based alloy comprising, the contents being expressed by weight, between 0.5 and 2.5% aluminum and, optionally, one or more elements chosen from: Pb≤0.003%; Sb≤0.003%; Bi≤0.003%; 0.002%≤Si≤0.070%; La<0.05%; Ce<0.05%, the balance consisting of zinc and inevitable impurities, a heat pretreatment is optionally carried out, the sheet is cut in order to obtain a part, the part is heated so as to form, by alloying between the steel and the precoat, an alloyed coating consisting, over more than 90% of its thickness, of at least one Fe/Zn-based phase, the Fe weight content of which is equal to 65% or higher and the Fe/Zn ratio of which is between 1.9 and 4, and so as to give the steel a partially or completely austenitic structure;

the part undergoes hot deformation and the part is cooled under conditions suitable for giving the steel part the intended mechanical properties.

According to a preferred embodiment, the precoat is an alloy the aluminum content of which is not less than 0.5% but not more than 0.7% by weight.

Also preferably, the precoat is an alloy the aluminum content of which is greater than 0.7% but not more than 0.8% by weight.

Preferably, the precoat is an alloy the aluminum content of which is greater than 0.8% but not more than 2.5% by weight.

According to a preferred embodiment, a hot-rolled or cold-rolled steel sheet is provided, the composition of which comprises, the contents being expressed by weight: 0.15%≤C≤0.5%; 0.5%≤Mn≤3%; 0.1%≤Si≤0.5%; 0.01%≤Cr≤1%; Ti≤0.2%; Al≤0.1%; S≤0.05%; P≤0.1%; 0.0005%≤B≤0.010%, the balance of the composition consisting of iron and inevitable impurities resulting from the smelting.

Also preferably, a hot-rolled or cold-rolled steel sheet is provided, the composition of which comprises, the contents being expressed by weight: 0.15%≤C≤0.25%; 0.8%≤Mn≤1.5%; 0.1%≤Si≤0.35%; 0.01%≤Cr≤0.3%; Ti≤0.1%; Al≤0.1%; S≤0.05%; P≤0.1%; 0.002%≤B≤0.005%, the balance of the composition consisting of iron and inevitable impurities resulting from the smelting.

According to one preferred embodiment, the heat pretreatment comprises heating up to a temperature ranging from 450° C. to 520° C. for a soak time thereof ranging from 2 to 10 minutes.

Preferably, in order to achieve the alloying and to give the steel a partially or completely austenitic structure, the heating is carried out at a temperature between Ac1 and Ac3+100° C., the duration of the soak at said temperature being not less than 20 s.

The subject of the invention is also the use of a part described above, or manufactured according to one of the variants described above, for the manufacture of structural or safety parts for a terrestrial motor vehicle.

BRIEF DESCRIPTION OF THE DRAWINGS

Other features and advantages of the invention will become apparent over the course of the description given below by way of example and with reference to the following appended figures.

DETAILED DESCRIPTION

Figure 1:
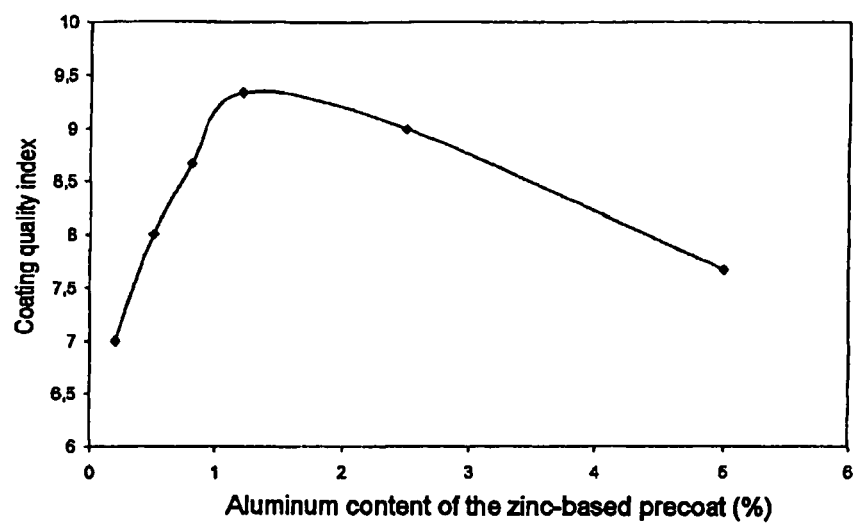
FIG. 1 shows the variation of an index that characterizes the quality of the coating as a function of the aluminum content of the zinc-based precoat.

Compared with a precoat obtained from pure zinc, the inventors have surprisingly discovered that the quality of the coating formed after a heat treatment for alloying between the base steel and the precoat is considerably improved when the precoat consists of a zinc-based alloy containing a particular amount of aluminum. FIG. 1 shows the variation of an index characterizing the quality of the coating as a function of the aluminum content of the zinc-based precoat. This index takes into account the compactness, roughness and crazing-resistance properties of the coating. The rating for this index goes from 0 to 10 (10=very good compactness, roughness and crazing-resistance properties; 0=very mediocre behavior).

When the aluminum weight content of the precoat is less than 0.5%, the compactness of the alloyed coating formed is mediocre, the coating having pores of variable size that developed during the alloying treatment. In addition, under these conditions the presence of a highly developed crazing network is revealed.

When the aluminum content is greater than 2.5%, the quality of the coating decreases substantially owing to an increase in roughness.

When the aluminum content of the zinc-based precoat is between 0.5 and 0.7%, the coating has an advantageous combination, particularly with regard to the roughness and crazing-resistance properties. These properties are further improved when the aluminum content is greater than 0.7% but does not exceed 0.8%.

The optimum combination of compactness, wear resistance and crazing resistance is obtained when the aluminum content of the zinc bath is greater than 0.8% but no more than 2.5%.

The zinc-based precoat may be deposited on the base steel by a hot-dipping process, by electrodeposition, by a vacuum deposition process or by any other process. The deposition is preferably carried out continuously. Apart from aluminum, the zinc-based precoat may optionally contain one or more elements from:

lead, antimony and bismuth, the weight content of each of these three elements not exceeding 0.003% in order to avoid the spangling effect in the case of hot-dipped coatings;

silicon, with a weight content not less than 0.002%, makes it possible to avoid the formation of an excessively large $Fe_xAl_y$ interfacial layer. However, when the silicon content is greater than 0.070%, dross is formed in the case of hot-dipped coatings; and lanthanum and cerium, in an amount not exceeding 0.05%, favor wettability of the surface with respect to the zinc bath.

The zinc-based precoat may also contain inevitable impurities, such as for example cadmium, tin or copper. When the precoat is formed by a hot-dip process, iron and manganese may thus be especially present as impurities.

Advantageously, the base steel on which the precoat is deposited has the following composition by weight:

a carbon content of between 0.15 and 0.5%, and preferably between 0.15 and 0.25% by weight. This element plays a major role in the hardenability and in the mechanical strength obtained after the cooling that follows the austenization and alloying treatment. Below a content of 0.15% by weight, the hardenability is however too low and the strength properties are insufficient. In contrast, above a content of 0.5% by weight, risk of forming defects is greater during hardening, particularly in the case of the thickest parts. A carbon content of between 0.15 and 0.25% makes it possible to obtain a strength of between approximately 1250 and 1650 MPa;

manganese, apart from its deoxidizing role, also has a major effect on the hardenability, in particular when its weight content is at least 0.5% and preferably 0.8%. However, too large an amount (3% by weight or preferably 1.5%) results in the risk of excessive segregation;

the silicon content of the steel must be between 0.1 and 0.5% by weight, and preferably between 0.1 and 0.35% by weight. Apart from its role in deoxidation of the liquid steel, this element contributes to the hardening of the steel, but its content must however be limited in order to avoid excessive formation of oxides and to promote coatability;

chromium, above a content greater than 0.01%, increases the hardenability and contributes to achieving a high strength after the hot-forming operation, in the various portions of the part after the cooling following the alloying and austenization heat treatment. Above a content of 1% (preferably 0.3%), the contribution of chromium to achieving this uniformity in mechanical properties is saturated;

aluminum is an element that promotes deoxidation and precipitation of nitrogen. In an amount greater than 0.1% by weight, it forms coarse aluminates during production, which encourages the content of aluminum to be limited to this value;

sulfur and phosphorus in excessive quantities result in increased brittleness. This is why it is preferable to limit their respective contents to 0.05 and 0.1% by weight;

boron, the content of which must be between 0.0005 and 0.010% by weight, and preferably between 0.002 and 0.005% by weight, is an element that plays a major role in hardenability. Below a 0.0005% content, no satisfactory hardenability effect is obtained. The full effect is obtained for a content of 0.002%. The maximum boron content must be less than 0.010%, and preferably 0.005%, in order not to degrade the toughness; and titanium has a high affinity for nitrogen, and therefore helps to protect boron so that this element is in free form in order to house its full effect on hardenability. Above 0.2%, and more particularly 0.1%, there is however a risk of forming coarse titanium nitrides in the liquid steel, which have a deleterious effect on toughness.

In the process according to the invention, a hot-rolled or cold-rolled sheet of steel having the composition presented above is provided and precoated with a zinc-based alloy having the composition also presented above. Before or after heat treatment, the sheet is cut in order to obtain a part. This part is then heated in order to carry out, jointly:

an alloying treatment so as to form a coating consisting, over more than 90% of its thickness, of at least one Fe/Zn-based phase, the Fe weight content of which is equal to 65% or higher and the Fe/Zn ratio of which is between 1.9 and 4. During the alloying reaction, the elements of the steel sheet, especially iron, manganese and silicon, diffuse into the coating. Certain elements of the precoating, especially zinc and aluminum, also diffuse; and an austenization of the base steel, this austenization possibly being partial or complete. Advantageously, the heating in a furnace is carried out in such a way that the part reaches a temperature between Ac1 and Ac3+100° C. Ac1 and Ac3 denote the austenitic transformation start and end temperatures respectively. According to the invention, the soak time at this temperature is not less than 20 s so as to make the temperature in the various points of the part uniform. The hot-forming operation is then carried out on the part, this operation being favored by the reduction in flow stress and the increase in ductility of the steel with temperature. Starting from the partially or completely austenitic structure, the part will then be cooled under appropriate conditions so as to give the intended mechanical properties to the part. In particular, the part may be kept within a tool during the cooling, the tool itself possibly being cooled in order to favor extraction of the heat. To obtain high mechanical properties, it will be preferable to obtain martensitic or bainitic-martensitic microstructures.

Optionally, a heat pretreatment may be carried out after the abovementioned precoating step. This heat pretreatment comprises heating up to a temperature ranging from 450.degree. C. to 520.degree. C. for a time ranging from 2 to 10 minutes. This heat pretreatment increases the compactness of the coating formed after the combined alloying/austenization treatment, and also the crack resistance of this coating. It has also been found that this heat pretreatment favors the formation of coatings consisting, over more than 90% of their thickness, of two iron-rich phases, the iron weight content of which is equal to 65% or higher and the Fe/Zn ratio of which is between 1.9 and 4. In the absence of pretreatment, the coatings tend to consist of a single, iron-rich, phase. Without wishing to be tied by one theory, it is believed that this pretreatment modifies the interface between the steel and the precoat, and therefore the diffusion phenomena which occur during the subsequent alloying treatment.

As examples, cold-rolled steel sheets with a thickness ranging from 1.3 to 1.6 mm were considered, these having the following composition by weight:
carbon: 0.22%;
manganese: 1.3%;
silicon: 0.30%;
phosphorus<0.010%;
sulfur: 0.005%;
chromium: 0.18%;
titanium: 0.025%;
aluminum: 0.050%; and
B: 0.003%.

The steel sheets were precoated by hot-dipping in a bath based on zinc containing aluminum in an amount ranging up to 5%, lead, antimony and bismuth, these three elements in an amount of less than 0.003%, and also iron, as inevitable residual element, in an amount of less than 0.020%. Pure zinc precoats were also deposited by electrodeposition. In the case of hot-dipped coatings, the thickness of the precoat was about 10 to 20 microns, while in the case of electrodeposited coatings, the thickness was around 10 microns.

Some of the sheets underwent an alloying heat pretreatment between 470 and 520° C. for a time ranging from 2 to 10 minutes. The sheets were then cut to obtain parts.

These parts were then heated up to a temperature of 930° C. (i.e. Ac3+70° C.) and soaked for 3 minutes at this temperature. The heating time, including the temperature rise time and the soak time at 930° C., was 10 minutes. These conditions resulted in complete austenitic transformation of the base steel. During this heat-up and soak phase, it was found that the zinc-based precoat formed, over more than 90% of its thickness, one or more Fe/Zn phases, the iron weight content of which was 65% or higher and the Fe/Zn ratio of which was between 1.9 and 4, by an alloying reaction between the base steel and the zinc-based precoat. This alloyed coating having a high melting point and a high hardness exhibits great corrosion resistance and prevents the subjacent base steel from being oxidized and decarburized during and after the heating phase.

After the 930° C. heating phase, the parts were subjected to a 5% hot deformation.

Subsequent cooling in air resulted in a bainitic-martensitic structure. The mechanical strength obtained after such a treatment was greater than 750 MPa.

The alloyed coatings were then characterized by the following techniques:

micrograph sections were used to assess the compactness of the coatings, and also the presence of any indentation thereof within the base sheet in certain hot-deformed zones;

a visual observation and measurements carried out on a roughness meter enabled the roughness parameter Ra to be quantified and the crazing of the coatings after heat treatment and deformation, and also the wear resistance of the tools, to be evaluated; and observations using a scanning electron microscope in phase contrast mode enabled the phases present in the coatings to be identified.

Figure 2:
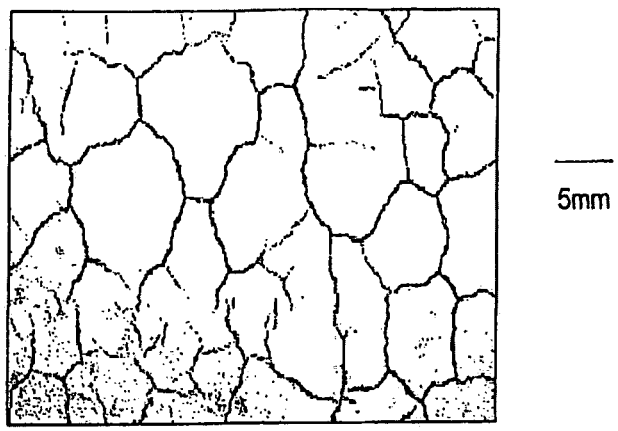
FIG. 2 is a surface view of crazing observed on the surface of a steel coated using a manufacturing process not in accordance with the invention.
Figure 3:
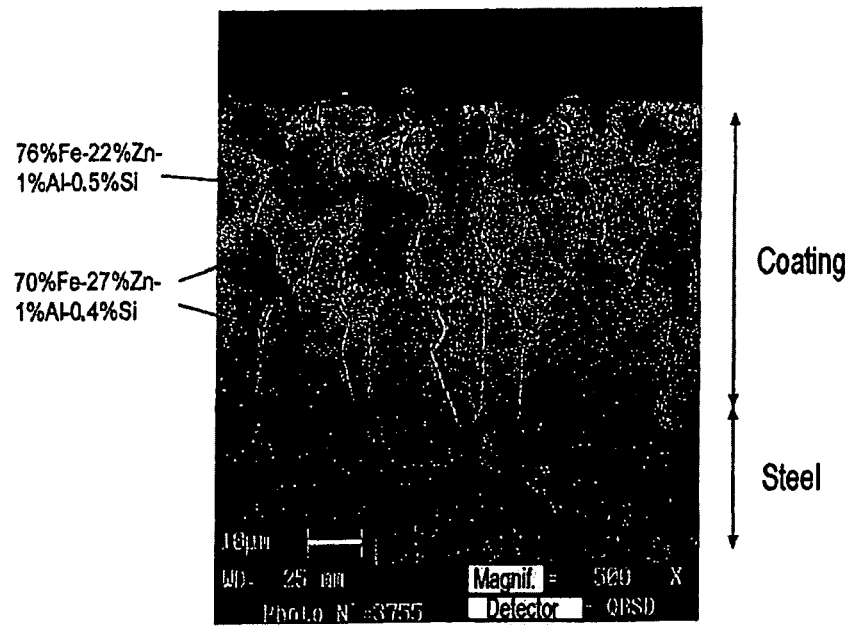
FIG. 3 is a microstructural view in cross section of a steel sheet having a coating according to the invention.

The results of these observations are the following:

under the conditions according to the invention, the coating formed by alloying consists of iron-rich Fe/Zn phases, the iron weight content of which is equal to 65% or higher and the Fe/Zn ratio of which is between 1.9 and 4, over more than 90% of its thickness. The micrograph shown in FIG. 3, obtained by scanning electron microscopy, illustrates an example according to the invention: the alloyed coating consists mostly over its thickness of two phases: a very pale phase of mean composition: 70% Fe/27% Zn/1% Al/0.4% Si and a phase of light gray appearance comprising 76% Fe/22% Zn/1% Al/0.5% Si. The presence of manganese in smaller amounts may be noted. The presence of silicon and manganese, and of course the presence of iron, bears witness to the diffusion of the base metal into the precoat during the alloying/austenization treatment. A few rare residual pores (dark regions) are also present. At the outermost surface of the specimen, the presence of a higher zinc content may be noted, which reinforces the corrosion protection;

when the aluminum content is less than 0.5% in the precoat, the compactness of the alloyed coating formed is mediocre, the coating having many relatively well-developed pores. Under these conditions, the presence of a highly pronounced surface crazing network is also revealed. FIG. 2 shows an example of such crazing for an aluminum content of 0.1%, that is to say outside the conditions of the invention;

when the aluminum content is greater than 2.5% in the precoat, the roughness increases substantially, going from Ra=1.3 microns to Ra=3 microns; and when the aluminum content of the zinc-based precoat is between 0.5 and 2.5%, the coating exhibits a very good combination of compactness, low roughness and absence of crazing. It is also noted that there is no indentation of the coating into the base steel during the hot deformation, even in the regions of pronounced concavity. In addition, when the aluminum content is greater than 0.7% and preferably 0.8%, the resistance to the occurrence of crazing is at its highest level.

Thus, the invention makes it possible to manufacture coated parts having high properties, the metal coating having a particularly favorable combination of compactness, low roughness, absence of crazing and indentation resistance. The maximum strength of the parts may be adapted to the intended use according to the composition of the steel, in particular its carbon content and its manganese, chromium and boron content.

These parts will be profitably used for the manufacture of safety parts, and especially anti-intrusion or substructure parts, strengthening bars, and center pillars, for the construction of motor vehicles.

What is claimed is:

1. A steel part comprising:
a steel substrate; and
a compound formed by at least one heat treatment alloying the steel substrate and a precoat of a zinc-based alloy including, the contents of the precoat being expressed by weight, greater than 0.8% but not more than 2.5% aluminum and, optionally, one or more elements chosen from the group consisting of:
$Pb \leq 0.003\%$;
$Sb \leq 0.003\%$;
$Bi \leq 0.003\%$;
$0.002\% \leq Si \leq 0.070\%$;
$La < 0.05\%$; and
$Ce < 0.05\%$;
a balance being zinc and inevitable impurities; and
a coating comprising said compound, the coating having a thickness extending from the steel substrate, over more than 90% of the thickness, at least one Fe/Zn-based phase, the iron weight content of which is equal to 65% or higher and the Fe/Zn ratio of which is between 1.9 and 4.

2. The steel part as recited in claim 1, wherein a composition of the steel comprises, the contents being expressed by weight:
$0.15\% \leq C \leq 0.5\%$;
$0.5\% \leq Mn \leq 3\%$;
$0.1\% \leq Si \leq 0.5\%$;
$0.01\% \leq Cr \leq 1\%$;
$Ti \leq 0.2\%$;
$Al \leq 0.1\%$;
$S \leq 0.05\%$;
$P \leq 0.1\%$; and
$0.0005\% \leq B \leq 0.010\%$,
a balance of the composition including iron and inevitable impurities resulting from the smelting.

3. The steel part as claimed in claim 2, wherein the composition of the steel comprises, the contents being expressed by weight:
$0.15\% \leq C \leq 0.25\%$;
$0.8\% \leq Mn \leq 1.5\%$;
$0.1\% \leq Si \leq 0.35\%$;
$0.01\% \leq Cr \leq 0.3\%$;
$Ti \leq 0.1\%$;
$Al \leq 0.1\%$;
$S \leq 0.05\%$;
$P \leq 0.1\%$; and
$0.002\% \leq B \leq 0.005\%$;
a balance of the composition including iron and inevitable impurities resulting from the smelting.

4. A structural or safety part for a terrestrial motor vehicle comprising:
a steel part as recited in claim 1.

5. The steel part as claimed in claim 1, wherein the precoat of a zinc-based alloy includes one or more elements chosen from the group consisting of:
Pb≤0.003%;
Sb≤0.003%; and
Bi≤0.003%.

6. The steel part as claimed in claim 1, wherein the precoat of a zinc-based alloy includes 0.002%≤Si≤0.070%.

7. The steel part as claimed in claim 1, wherein the precoat of a zinc-based alloy includes one or more elements chosen from the group consisting of La<0.05%; and
Ce<0.05%.

8. The steel part as claimed in claim 1, wherein the at least one Fe/Zn-based phase includes a first phase and a second phase each with the iron weight content equal to 65% or higher and the Fe/Zn ratio between 1.9 and 4, but with different iron weights.

9. The steel part as claimed in claim 1, wherein the at least one Fe/Zn-based phase includes a first phase and a second phase each with the iron weight content equal to 65% or higher and the Fe/Zn ratio between 1.9 and 4, but with different zinc weights.

10. The steel part as claimed in claim 1, wherein the at least one Fe/Zn-based phase includes a first phase and a second phase each with the iron weight content equal to 65% or higher and the Fe/Zn ratio between 1.9 and 4, but with different iron and zinc weights.

11. The steel part as claimed in claim 1, wherein the at least one Fe/Zn-based phase includes manganese.

12. The steel part as claimed in claim 1, wherein the base steel has a martensitic microstructure.

13. The steel part as claimed in claim 1, wherein the base steel is bainitic-martensitic microstructure.

14. The steel part as claimed in claim 1, wherein the steel part has a mechanical strength greater than 750 Mpa.

\* \* \* \* \*